United States Patent [19]

Dray

[11] 3,848,617

[45] Nov. 19, 1974

[54] MEANS FOR MAINTAINING A FIXED FLOW THROUGH A BREATHING REGULATOR IN AN INHALATION SYSTEM

[75] Inventor: Walter L. Dray, Davenport, Iowa

[73] Assignee: The Bendix Corporation, South Bend, Ind.

[22] Filed: Dec. 29, 1972

[21] Appl. No.: 319,422

[52] U.S. Cl.............. 137/88, 128/145.8, 137/98, 137/606, 137/608
[51] Int. Cl....A61m 16/00, F16k 37/00, G05d 11/13
[58] Field of Search .............. 137/88, 93, 98, 597, 137/606, 608; 73/290; 324/58 A, 84; 128/145.6, 145.8, 188, 145.5

[56] References Cited
UNITED STATES PATENTS

| | | | |
|---|---|---|---|
| 1,763,305 | 6/1930 | Heidbrink | 137/606 |
| 2,146,930 | 2/1939 | Bassett | 137/606 |
| 3,386,474 | 6/1968 | Kimmel | 137/608 |
| 3,392,747 | 7/1968 | Waldrop | 137/597 |
| 3,399,345 | 8/1968 | Cohn | 324/84 |
| 3,534,753 | 10/1970 | Ollivier | 137/88 |
| 3,566,387 | 2/1971 | Schoener et al. | 128/145.5 |
| 3,566,865 | 3/1971 | Hay | 128/188 |
| 3,572,119 | 3/1971 | Bak | 73/290 |
| 3,593,735 | 7/1971 | Reiher | 137/88 |
| 3,628,555 | 12/1971 | Nagano | 137/88 |
| 3,659,598 | 5/1972 | Peters et al. | 128/145.8 |
| 3,665,682 | 5/1972 | Ciavattoni et al. | 137/608 |
| 3,693,653 | 9/1972 | Cramer et al. | 137/98 |
| 3,700,005 | 10/1972 | Fletcher et al. | 137/608 |
| 3,704,410 | 11/1972 | O'Brien | 324/58 A |
| 3,727,627 | 4/1973 | Bird et al. | 128/145.8 |

Primary Examiner—William R. Cline
Assistant Examiner—George L. Walton
Attorney, Agent, or Firm—Leo H. McCormick, Jr.; William N. Antonis

[57] ABSTRACT

A fluid supply system having a mixing regulator for mixing two gases, such as air and oxygen, in a predetermined ratio and delivering the resultant fluid mixture at a flow rate above a predetermined fixed flow rate through a supply conduit to a flow control valve in response to an operational requirement. When a flow rate for an operational requirement is selected below the fixed flow rate, a relief valve is activated to divert a portion of the fluid mixture in the supply conduit into the atmosphere to maintain the fixed flow rate through the regulator. A fluid analyzer downstream from the relief valve is connected to the supply conduit to present a visual indication of the ratio of the fluids in the mixture.

12 Claims, 3 Drawing Figures

PATENTED NOV 19 1974  3,848,617
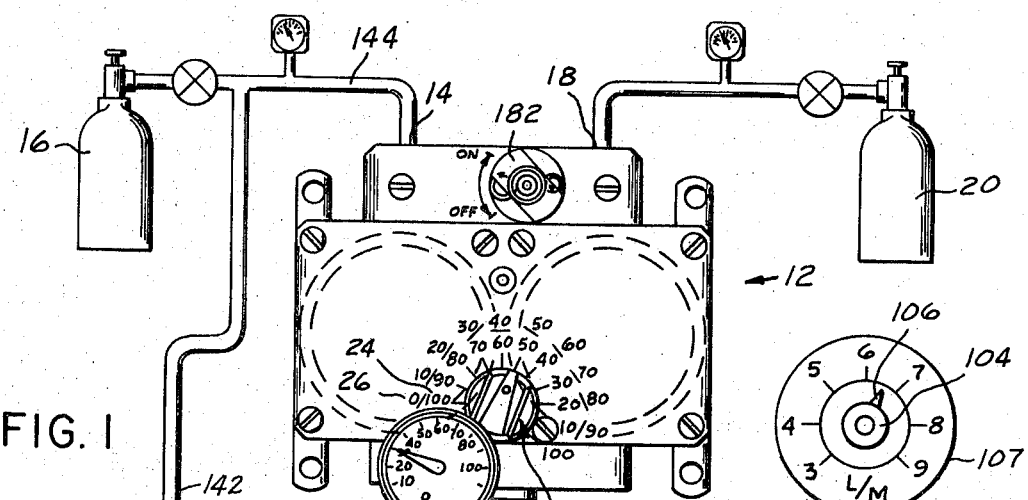
FIG. 1
FIG. 2
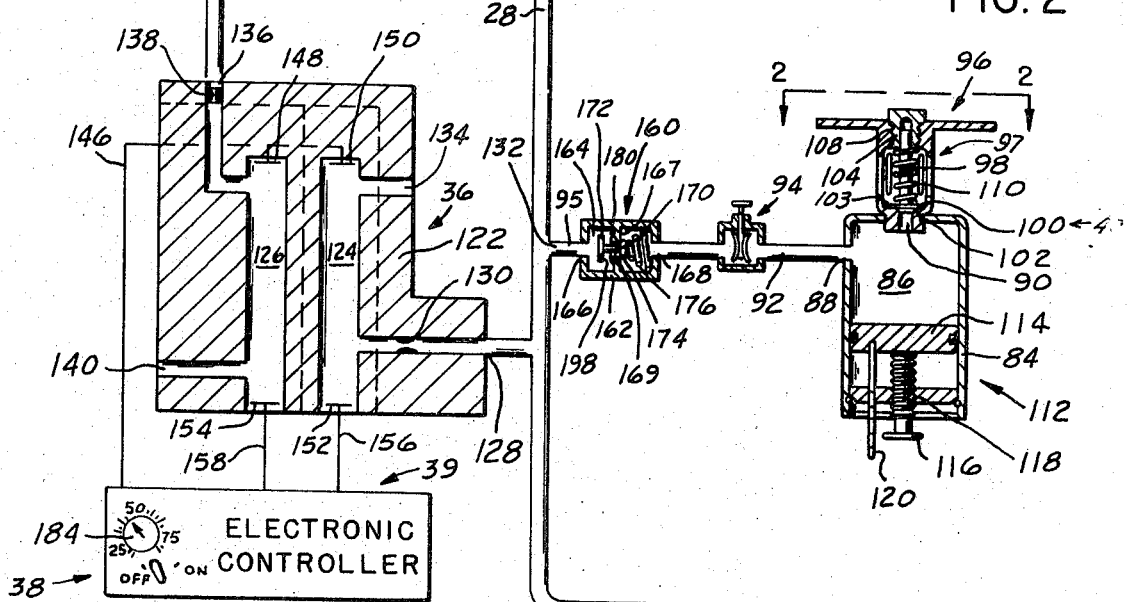
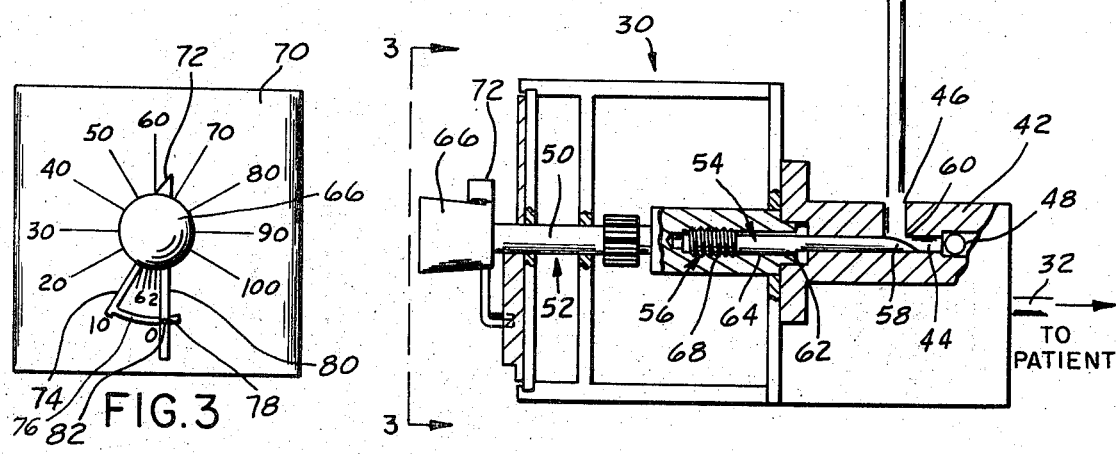
FIG. 3
TO PATIENT

MEANS FOR MAINTAINING A FIXED FLOW THROUGH A BREATHING REGULATOR IN AN INHALATION SYSTEM

BACKGROUND OF THE INVENTION

In most inhalation therapeutic equipment now available, in order to mix two fluids it is necessary that each fluid be maintained at a pressure range of 50 to 70 psi. Each fluid is sent through a flowmeter through which the output flow can be adjusted in a manner to create a proportioned fluid mixture. This is sufficient if a constant flow is desired, but where a sinusoidal flow, such as that caused by breathing, is desired, the flow rate will vary. As a result the proportions of the two fluids will not remain stable.

Later a fluid mixing regulator, as disclosed in U.S. Pat. No. 3,693,653 assigned to the same assignee of this invention and incorporated herein by reference, was developed capable of adding a constant percentage of one fluid to a second fluid within ± 3 percent between the flow rates of 10 – 100 liters per minute by dialing a desired ratio into a proportioning valve.

For adults receiving oxygen with this type of therapeutic device, the 3 percent limit on the 10–100 liter per minute flow rate is entirely satisfactory; however, for infants and young children because of the size of their lungs, the maximum amount of therapeutic fluid mixture may range from 2–10 liters per minute. Unfortunately with such a low flow rate, the ratio of the fluid to the mixture cannot be adequately maintained by known regulating valves.

SUMMARY OF THE INVENTION

To be assured that the desired proportion of a first gas is maintained in a fluid mixture delivered to a therapeutic breathing apparatus during low flow rates, I have devised a supply system wherein the fluid flow from a regulator is maintained at a predetermined fixed flow rate and the excess fluid mixture above the low flow rate is diverted to the atmosphere through an adjustable relief valve means. A fluid analyzer means located adjacent the therapeutic breathing apparatus is adapted to compute the ratio of the first gas in the fluid mixture. This will provide an operator with visual read out of the constituents in the fluid mixture and assure that the desired ratio is reaching the patient.

It is, therefore, the object of this invention to provide a means for maintaining a predetermined ratio of fluids in a mixture during a low flow rate condition.

It is still another object of this invention to provide a therapeutic apparatus with a variable relief valve means to allow a portion of a fluid mixture to escape into the atmosphere while maintaining a fixed flow rate through a regulator when operational requirements are below a predetermined flow rate.

BRIEF DESCRIPTION OF THE DRAWINGS

FIG. 1 is a schematic illustration of a therapeutic system for supplying a recipient with a breathable fluid mixture with sectional views of the flow rate control and analyzing means.

FIG. 2 is a sectional view taken along lines 2—2 of FIG. 1 showing the adjustment on the relief valve means to proportionally allow a portion of the fluid mixture to escape into the atmosphere in response to an operational requirement.

FIG. 3 is a sectional view taken along line 3—3 of FIG. 1.

DETAILED DESCRIPTION OF THE PREFERRED EMBODIMENT

FIG. 1 shows a therapeutic breathing system 10 having a regulator means 12, of a type fully described in U.S. Pat. No. 3,693,653 previously incorporated herein by reference, having a first inlet port 14 connected to a first source of fluid (usually oxygen) under pressure retained in container 16 and a second inlet port 18 connected to a second source of fluid (usually air) under pressure retained in container 20. Dial means 22 has a first scale 24 for indicating a percentage of the first fluid and a second scale 26 for indicating a percentage of the second fluid which are combined into a resulting fluid mixture which is communicated to a supply conduit 28.

The supply conduit is connected to a flow control valve means 30. The flow control valve means 30 is adapted to deliver the fluid mixture through a flow meter (not shown) before being presented to a recipient through conduit 32 in a first mode of operation above a fixed flow rate. Conduit 32 can be connected to either a tent, an incubator (not shown) which completely encloses the recipient, a mask which covers the head of the recipient, or directly to the tracheal tube of the recipient.

An analyzer means 36 is connected to the supply conduit 28 to continually display the computed ratio of fluid mixture in a display means 38 of computer means 39.

A relief valve means 40 connected to the supply conduit 28, upstream from the analyzer means 36, is adapted to be operated in a second mode of operation during a fixed flow rate. The analyzer means 36 through the display means 38 will provide a check to assure continuity in the ratio of first and second fluids as set by dial means 22 when going from the first mode to the second mode.

In more particular detail, the flow control valve means 30 includes a housing 42 with a control chamber 44 having an inlet port 46 connected to the supply conduit 28 and an outlet port 48 connected to a flow meter means (not shown). A valve stem 50 extends through the housing 42 into the control chamber 44. The valve stem means 50 is made up of two parts 52 and 54 joined together by a coupling 56. Part 54 has a curved face 58 which cooperates with a seat 60 to meter the flow of the fluid mixture in conduit 28 to the outlet port 48. Part 54 has a side projection 62 which slides in groove 64 in the housing 42 to prevent the curved face 58 from being rotated as positioning knob 66 of part 52 is screwed into threads 68. Coupling 56 is designed to convert the rotary motion of part 52 into linear motion for part 54. The positioning knob 66 overlies a scale 70, as shown in FIG. 3, which indicates the liters per minute from 0–100. When the pointer 72 on knob 66 reaches 10 liters per minute, a follower 74 is engaged. Follower 74 has an arcuate guide 76 which passes through an opening 78 in a stop plate 80. A thumb screw 82 in the stop 80, engages the guide 76 to lock the knob in the set position between 0–10 liters per minute. The thumb lock of the follower 74 will prevent inadvertent movement of the flow control valve when the therapeutic breathing system is being used for a recipient with a small lung capacity.

The relief valve means 40 includes a housing 84 having a control chamber 86 with an inlet port 88 and an outlet port 90. The inlet port 88 is connected to the supply conduit 28 by a control conduit 92. An on-off valve means 94 is located in the control conduit 92 to prevent flow of the fluid mixture from the conduit 28 during the first mode and allow unrestricted flow during the second mode of operation. A safety shut-off switch 160 located adjacent the on-off valve means 94 includes a housing 162 with a flow chamber 164 therein. The flow chamber 164 has an inlet port 166 connected to conduit 95 and an outlet port 168 connected to conduit 92. A valve stem 170 with a poppet 172 is located in the flow chamber 164. A stop pin 174 is attached to the valve stem 170 for engaging spring 176. Spring 176 urges the pin against the rear of the wall 167 in housing 162 surrounding passage 169 when the flow rate through the inlet port is above 15 liters per minute or any other set flow rate. Thus, if the operator inadvertently forgets to switch the on-off valve means 94 off, the force of the fluid mixture acting on the front 198 of the stem 170 will move face 172 against seat 180 to prevent any of the fluid mixture from flowing into control chamber 86 of the relief valve means 40 to erroneously activate the adjustable valve means 96.

The adjustable valve means 96 is located in the outlet port 90 to selectively seal chamber 86 from the atmosphere. The adjustable valve means 96 has a poppet means 97 with a valve stem 98 whose face 100 on the end thereof engages the seat 102 surrounding the outlet port 90. A keeper 104 has an indicator 106 which engages threads 108 in the housing 84 to urge resilient means or spring 110 against rear of face 100 on the stem 98. The indicator 106 overlies a scale 107 wherein flow rates between 3–9 liters per minute are illustrated.

A movable wall means 112 has a piston 114 with a hand control 116. The hand control 116 is screwed into threads 118 to change the size of the control chamber 86 corresponding to the flow rate set into the indicator 106. The size of the control chamber 86 is varied for each selected flow rate shown on indicator 106 to maintain the flow rate in the supply conduit 28 at a substantially uniform level. This is accomplished by spring biased poppet means 97 which upon opening permits release of the fluid mixture to the atmosphere. An indicator 120 is attached to the piston 114 to provide a visual indication of the size of the control chamber 86.

The analyzer means 36 includes a housing 122 with a fluid mixture chamber 124 and a control chamber 126. The fluid mixture chamber has an inlet port 128 with a restriction 130 therein and an outlet port 134 opened to the atmosphere. The inlet port 128 is connected to the supply conduit 28 downstream from the relief valve connection 132. The control chamber 126 has an inlet port 136 with a restriction 138 therein and an outlet port 140 opened to the atmosphere. The inlet port 136 is connected by conduit 142 to the conduit 144 going from the first source of gas to the inlet port 14 on the regulator means 12.

A transmitter means in the computer means 39 sends a signal on line 146 to the transmitters 148 and 150 in one end of the control and mixing chambers, respectively. A first receiver 152 is located in the other end of the mixing chamber 124 and a second receiver 154 is located in the other end of the control chamber 126. The first receiver 152 accepts the signal sent through the fluid mixture in chamber 124 and transmits a first operational signal representative thereof through line 156 to the computer or electronic controller means 39. The second receiver 154 accepts the signal sent through the first fluid in the control chamber and transmits a second operational signal representative thereof through line 158 to the computer means 39. The computer means evaluates the first operational signal in a manner well known in the electronics art with the second operational signal and in turn provides an output signal which drives the display means 38 to provide a visual indication of the ratio of first fluid in the fluid mixture.

PREFERRED MODE OF OPERATION OF THE EMBODIMENT

Since each patient or recipient will respond to different therapeutic fluid mixtures and flow rates, a physician will usually prescribe the most beneficial treatment for a set of conditions. For adults, the flow rate will normally be between 40–50 liters per minute with a range from 10–100 liters per minute. The operator in charge of the therapeutic treatment will set knob 66 at the desired flow rate, set the proportional mixture in the dial means 22, and turn the switch 182 of the regulator means 12 to the ON position. With the flow rate between 60–70 liters per minute as shown in FIG. 3, the fluid mixture will flow through the flow control means 30 directly to the patient. The analyzer means 36 will continually supply a read out to indicator 38 to provide a display in window 184 upon evaluation of the transmission of the first and second operational signals through the mixing chamber 124 and control chamber 126 to indicate the proportion of each fluid in the mixture.

Upon the physician determining that the patient's requirement is below a fixed flow rate, with respect to the regulator means 12 (10 liters per minute), the operator will move the knob 66 until pointer 72 engages follower 74 and is locked at the prescribed flow rate by thumb screw 78. Thereafter on-off valve means 94 will be turned on and the fluid mixture allowed to flow into control chamber 86. Since the flow rate is below a set rate (15 liters per minute), spring 176 of the safety shut off switch means 160 will allow the fluid mixture to flow through conduit 95. The operator will turn indicator 106 of the relief valve means 96 to the prescribed flow rate and thereby change the load on spring 110. At the same time, the operator will adjust hand control 116 and move piston 114 to change the size of the control chamber 86 to correspond with the flow rate on indicator 106. The graduation on indicator 120 should match the flow rate on 106.

The combined flow rate through the flow control valve means 30 and the relief valve means 96 is designed such that the flow rate in the supply conduit 28 from the regulator means is never below 10 liters per minute (or any other fixed flow rate). As the fluid mixture flows into the control chamber 86, the fluid pressure associated therewith will overcome the load on spring 110 and move face 100 away from seat 102 to permit that portion of the fluid mixture in excess of the prescribed flow rate to escape through the outlet port 90 into the atmosphere.

The analyzer means 36 being downstream from the relief valve means 96 will continually monitor the fluid mixture supplied to the flow control means 30, to assure continuity in the proportions of the first fluid and the second fluid in a manual shift from the first mode of operation to the second mode of operation by an operator.

Through the relief valve means the accuracy of the regulator means 12 can be predicted to be within ± 3 percent of the proportions set on dial means 22.

I claim:

1. In a therapeutic inhalation system having a mixing regulator for mixing a first fluid with a second fluid in a predetermined ratio and delivering a resultant breathable fluid mixture at a flow rate above a predetermined fixed flow rate through a supply conduit to a flow control valve in response to an operational requirement of a recipient, relief valve means controlled by an operator for diverting a portion of said breathable fluid mixture to the atmosphere when said operational requirement of the recipient is below said fixed flow rate to maintain said predetermined ratio, said relief valve means comprising:

adjustable means connected to said supply conduit for allowing an amount of the breathable fluid mixture between said fixed flow rate and a selected flow rate to escape into the atmosphere to maintain said predetermined ratio of fluid mixture at said fixed flow rate through said mixing regulator; and indicator means positioned by an operator for varying the selected flow rate in the adjustable means in a direct relationship with a change in the flow control valve.

2. The system, as recited in claim 1 wherein said relief valve means includes:

a housing having a control chamber therein;

connection means for communicating the fluid mixture in said supply conduit to said control chamber; and poppet means located in said housing and responsive to a fluid pressure corresponding to said selected flow rate for allowing said escape of fluid to the atmosphere through an opening in the housing.

3. The system, as recited in claim 2 wherein said relief valve means further includes:

resilient means connected to said housing for urging said poppet means against said opening to seal said chamber from the atmosphere, said indicator means being connected to said resilient means for varying the resistive force on said poppet means corresponding to a change in the operational requirements.

4. The system, as recited in claim 3, wherein said relief valve means further includes:

switching means activated by an operator upon going from above the fixed flow rate to below the fixed flow rate in the flow control valve for allowing a portion of the fluid mixture in the supply conduit to flow through said connection means into said chamber.

5. The system, as recited in claim 4, further including:

analyzer means connected to said supply conduit downstream from the relief valve means connection for monitoring the ratio of the first and second fluid in said resultant fluid mixture.

6. The system, as recited in claim 5, wherein said analyzer means includes:

a housing having a first chamber and a second chamber, said first chamber having a first restricted inlet port in communication with the supply conduit and a first outlet port connected to the atmosphere, said second chamber having a second restricted inlet port in communication with the source of said first fluid and a second outlet port connected to the atmosphere;

transmitter means connected to one end of each of said first and second chambers for sending an electrical signal therethrough;

first receiver means located in said first chamber for accepting said electrical signal therein as it passes through said fluid mixture to develop a first output signal;

second receiver means located in said second chamber for accepting said electrical signal therein as it passes through said first fluid to develop a second output signal; and comparator means for computing the ratio of said first fluid in the fluid mixture from said first and second output signals and for driving an indicator to visually display said ratio to an operator.

7. The system, as recited in claim 2, wherein said relief valve means includes:

wall means located in said housing for changing the size of said control chamber to correspond with the selected flow rate to avoid an adverse flow condition in said supply conduit during said escape of the breathable fluid to the atmosphere.

8. The system, as recited in claim 7, wherein said movable wall means includes:

piston means located in said control chamber;

hand control means connected to said housing for moving the piston means within said control chamber; and visual means connected to said piston means for informing an operator of the position of the piston means.

9. In a therapeutic inhalation system having a mixing regulator for mixing a first fluid with a second fluid in a predetermined fixed ratio and delivering the resultant fluid mixture at a flow rate above 10 liters per minute through a supply conduit to a flow control valve in response to an operational requirement, means for diverting a portion of said fluid mixture to ambient when the operational requirement at the flow control valve is below 10 liters per minute to maintain said predetermined fixed ratio of fluid mixture at said flow rate above 10 liters per minute through said mixing regulator, said means comprising:

a housing having a control chamber therein with an inlet port and an outlet port, said outlet port being connected to the atmosphere;

conduit means connecting said inlet port to said supply conduit;

relief valve means having a face adjacent said outlet port;

resilient means connected to said housing for urging said face toward said outlet port to seal said control chamber from the atmosphere, said resilient means being adaptable to provide a variable seating force on said face; and switching means activated by an operator for permitting said fluid mixture to flow through said conduit means into said control chamber, said fluid mixture overcoming said resiliently positioned face to allow that portion of the fluid mixture between 10 liters per minute and a desired flow rate for the operational requirement to escape into the atmosphere.

10. The system, as recited in claim 9, further including: analyzer means connected to said supply conduit downstream from said conduit means for continually monitoring the ratio of said first and second fluids in said fluid mixture.

11. The supply system, as recited in claim 10, wherein said analyzer means includes:
indicator means for displaying the monitored fluid mixture to provide an operator with a visual read out of the fluid mixture transmitted through the flow control valve.

12. The system, as recited in claim 11, wherein said flow control valve includes:
meter means having an adjustable face for regulating the flow rate of the fluid mixture.

* * * * *